US010656104B2

(12) United States Patent
Hill et al.

(10) Patent No.: US 10,656,104 B2
(45) Date of Patent: May 19, 2020

(54) METHOD, SYSTEM AND APPARATUS FOR NON-DESTRUCTIVE TESTING (NDT) OF ELECTRICAL POWER LINE SYSTEMS

(71) Applicant: Quanta Associates, L.P., Houston, TX (US)

(72) Inventors: James Ronald Hill, Burnaby (CA); Donald Dodds, Burnaby (CA); Jeffrey Victor Rogers, Edmonton (CA); Calvin Edward Stock, Lacombe (CA); Benjamin John William Nesbitt, Edmonton (CA)

(73) Assignee: Quanta Associates, L.P., Houston, TX (US)

( * ) Notice: Subject to any disclaimer, the term of this patent is extended or adjusted under 35 U.S.C. 154(b) by 30 days.

(21) Appl. No.: 16/163,276

(22) Filed: Oct. 17, 2018

(65) Prior Publication Data

US 2019/0113467 A1 Apr. 18, 2019

Related U.S. Application Data

(60) Provisional application No. 62/573,563, filed on Oct. 17, 2017.

(30) Foreign Application Priority Data

Oct. 17, 2017 (CA) ..................... 2982679

(51) Int. Cl.
*G01N 23/083* (2018.01)
*G01N 23/04* (2018.01)
*G01N 23/18* (2018.01)

(52) U.S. Cl.
CPC ........... *G01N 23/083* (2013.01); *G01N 23/04* (2013.01); *G01N 23/18* (2013.01); *G01N 2223/301* (2013.01)

(58) Field of Classification Search
CPC ...... G01N 23/083; G01N 23/04; G01N 23/18; G01N 2223/301
See application file for complete search history.

(56) References Cited

U.S. PATENT DOCUMENTS 6,104,776 A 8/2000 Oikawa
6,486,678 B1 * 11/2002 Spears .................. G01N 29/14
324/555

(Continued)

FOREIGN PATENT DOCUMENTS

WO 2016172611 A1 10/2016

OTHER PUBLICATIONS

Alsico USA, "KV-Gard Conductive Suit", retrieved from Internet <URL: https://www.alsicousa.com/kv-gard-r-jacket-pant-set-cc>, retrieved on Jan. 10, 2019, 1 page, Alsico USA, Kent, Ohio.

(Continued)

*Primary Examiner* — Taeho Jo
(74) *Attorney, Agent, or Firm* — Oathout Law Firm; Mark A. Oathout; Antony C. Edwards

(57) ABSTRACT

A system for non-destructive testing of an overhead energized electrical component. The system has a base, an X-ray source, an X-ray digital imager, and an imager controller. The system also has a removable electrically conductive flexible shield which is adapted to be operatively coupled to, and to encapsulate, at least the base, the X-ray source, the X-ray digital imager and the imager controller so as to form a shrouded system. In a use position, when the shrouded system is positioned adjacent the energized electrical component so as to non-destructively test the energized electrical component, the shield protects at least the base, the X-ray source, the X-ray digital imager and the imager controller from electric fields around the energized electrical compo- (Continued)

nent while allowing signal communication between at least the X-ray source and the energized electrical component.

19 Claims, 15 Drawing Sheets

(56) References Cited

U.S. PATENT DOCUMENTS

| | | |
|---|---|---|
| 9,488,603 B2 | 11/2016 | Stock |
| 2006/0041301 A1 | 2/2006 | Ferrari |
| 2009/0049611 A1 | 2/2009 | Braunreuther |
| 2012/0033788 A1 | 2/2012 | Kovarik |
| 2014/0126695 A1* | 5/2014 | Stock .................... G01N 23/04 378/58 |
| 2014/0188423 A1 | 7/2014 | Messinger et al. |
| 2017/0046975 A1* | 2/2017 | Becker ................ G09B 19/003 |
| 2017/0046977 A1* | 2/2017 | Becker ................ G09B 19/003 |
| 2017/0370857 A1* | 12/2017 | Dehghan Niri ........ G01B 15/00 |

OTHER PUBLICATIONS

Vidisco Ltd., "Flat Fox—17 Portable Inspection System" and "Fox—Rayzor Portable Inspection System" retrieved from Internet <URL: http://www.primexgroup.ca/xray.htm>, retrieved on Jan. 30, 2019, 1 page, Vidisco Ltd., Canada.

Copenheaver, Blaine R., International Search Report for PCT/US2018/056329, dated Dec. 21, 2018, 2 pages, ISA/US, Alexandria, Virginia.

Copenheaver, Blaine R., Written Opinion of the International Searching Authority for PCT/US2018/056329, dated Dec. 21, 2018, 4 pages, ISA/US, Alexandria, Virginia.

\* cited by examiner

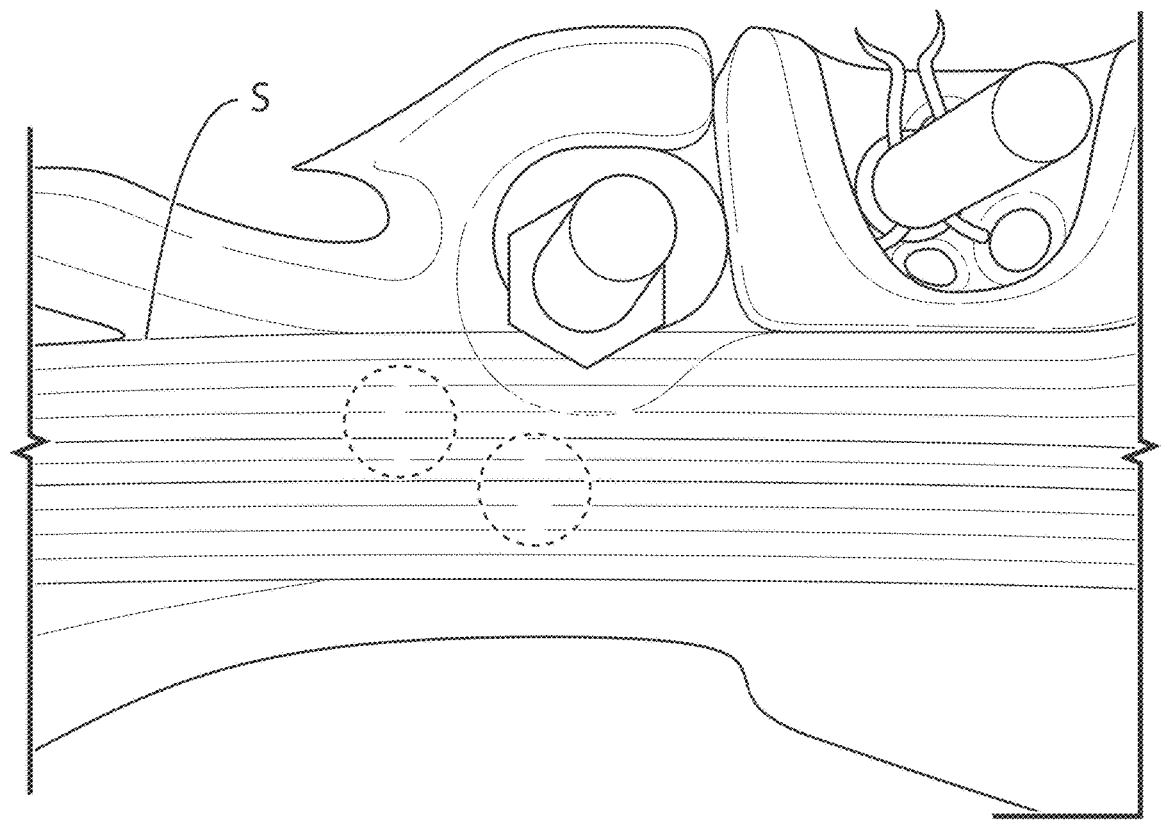
FIG. 7A1

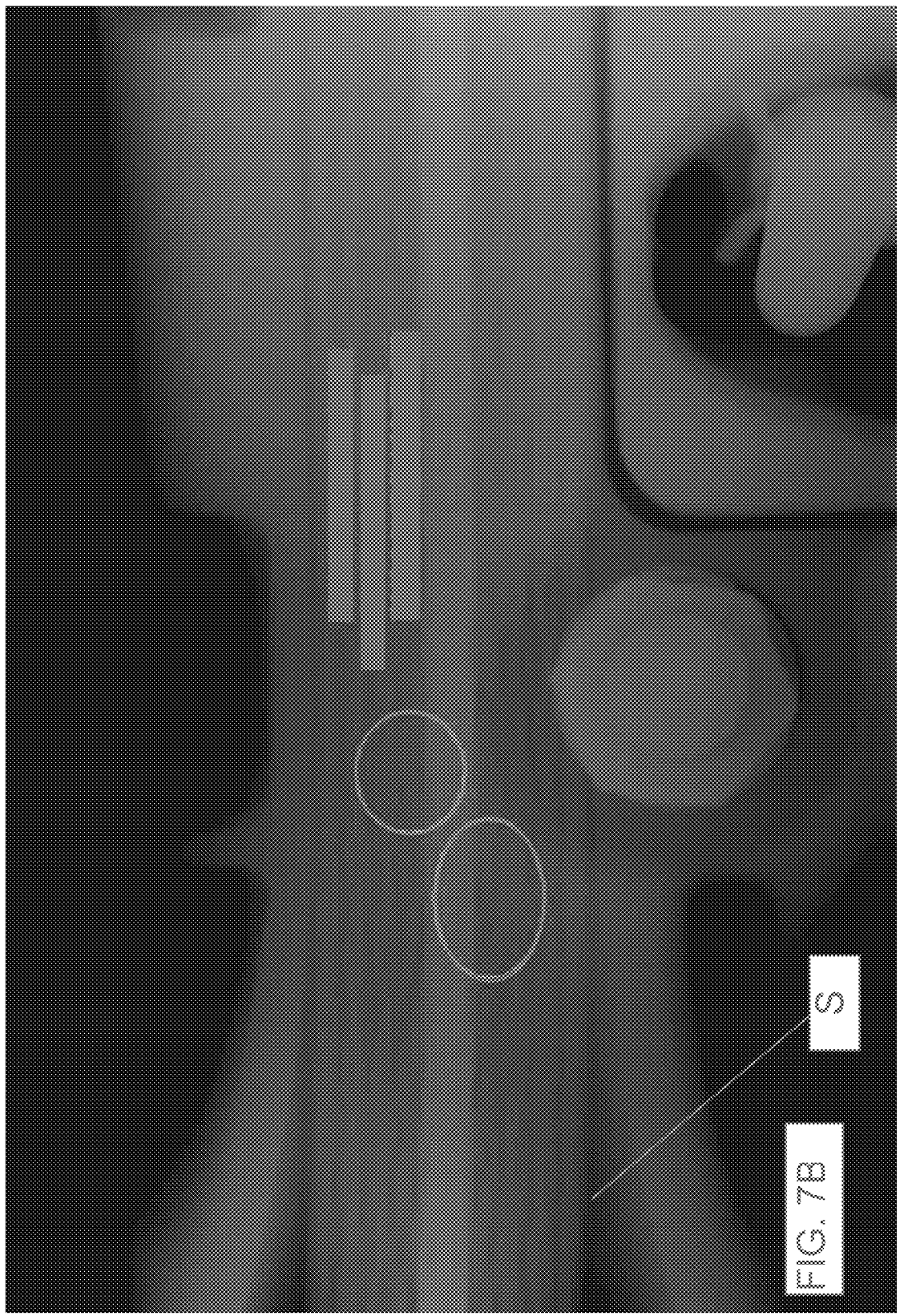

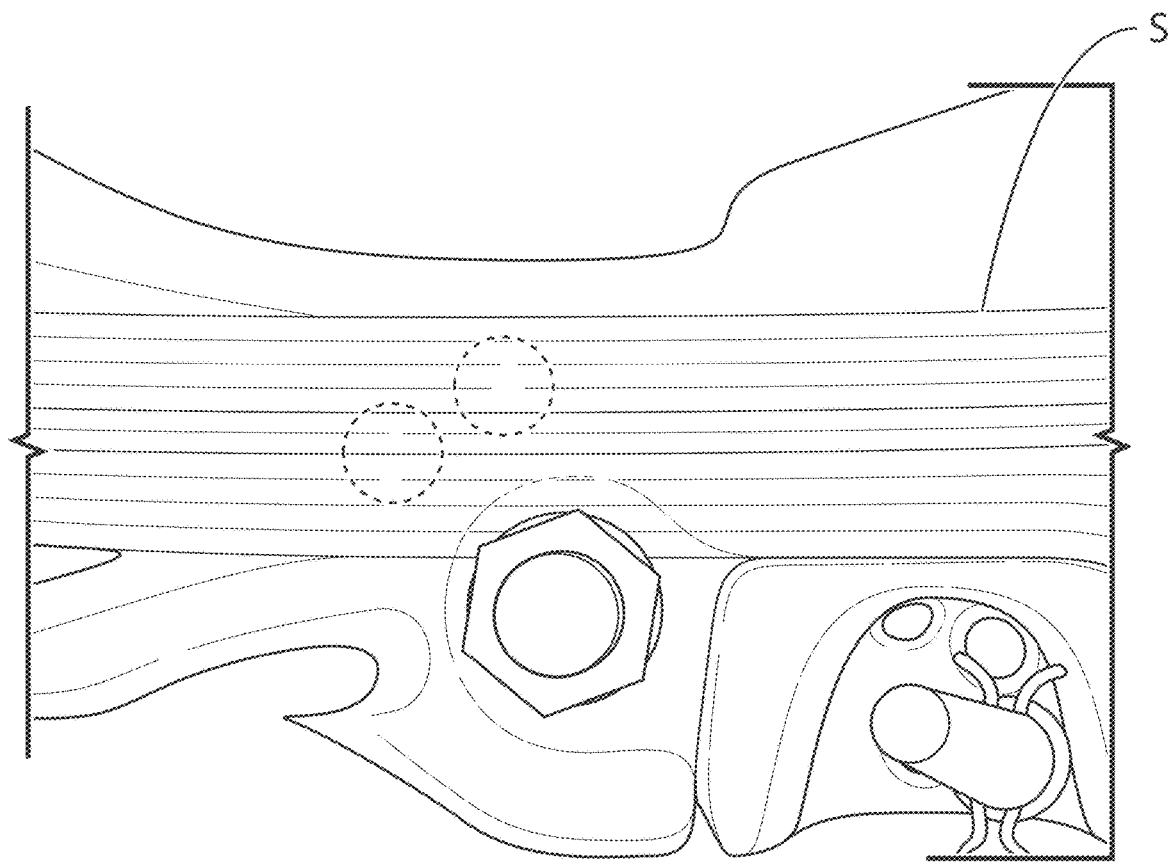
FIG. 7B1

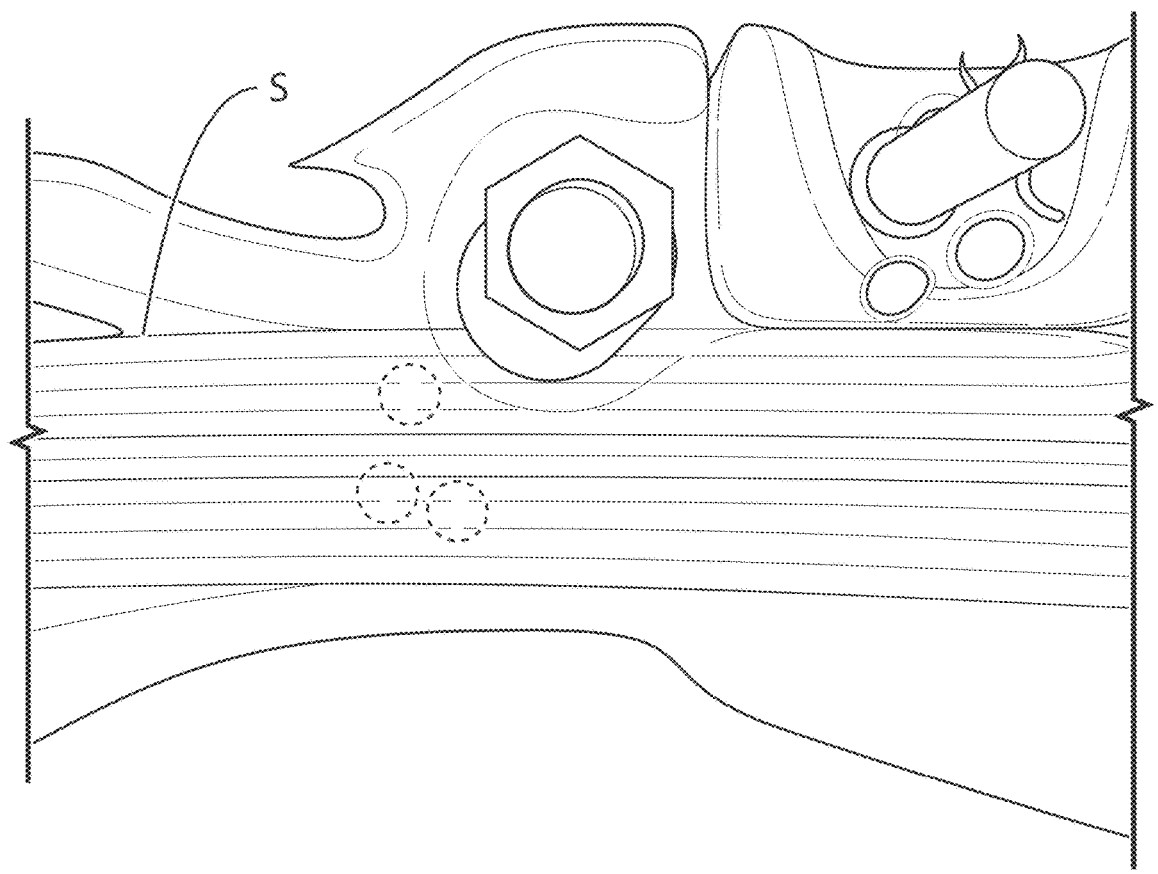
FIG. 7C1

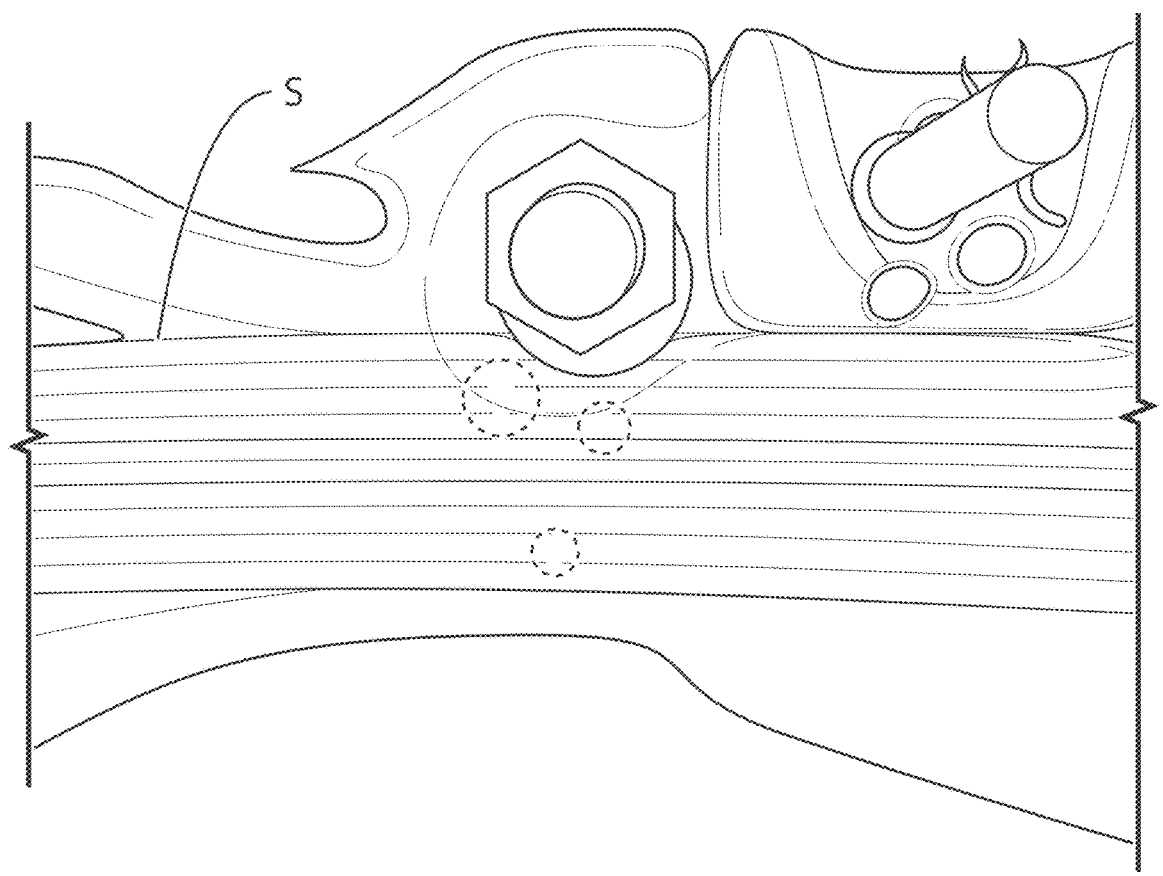
FIG. 7D1

METHOD, SYSTEM AND APPARATUS FOR NON-DESTRUCTIVE TESTING (NDT) OF ELECTRICAL POWER LINE SYSTEMS

CROSS-REFERENCE TO RELATED APPLICATIONS

This application claims priority from U.S. Provisional Patent Application No. 62/573,563, filed on Oct. 17, 2017 and Canadian Patent Application No. 2,982,679 filed on Oct. 17, 2017, both entitled, "Method, System And Apparatus For Non-Destructive Testing (NDT) Of Electrical Power Line Systems", entireties of which are incorporated herein by reference.

FIELD

Embodiments described herein generally relate to an apparatus and method for non-destructive testing of overhead electrical power line systems. More particularly, embodiments described herein relate to an apparatus and method for non-destructive testing of energized electrical components of said power line systems including but not limited to overhead electrical conductors, static lines, optical ground wires or substation bus pipes and their associated couplings/couplers.

BACKGROUND

Nondestructive testing (NDT) to identify defects in various electrical components of overhead electrical power line systems is known. NDT is often considered a preferred testing method as NDT allows for testing without destroying an object so that material qualities of an object can be examined, tested and studied without taking the object apart. NDT may be undertaken at various stages in the life cycle of an electrical component, for example, NDT may be undertaken during manufacture of the electrical component or during construction of an electrical power system to ensure that the electrical component is assembled correctly during said construction or during maintenance of the electrical power system to detect deterioration in the electrical component produced by the operating conditions or any combination of these stages. The defects detected by NDT may include but are not limited to structural flaws such as cracks, dents or pits in the electrical component, installation flaws including incorrect contact between the electrical component and a cooperating component or structure or development of leakage path(s) on the electrical component or between the electrical component and a cooperating component or structure. Ensuring the integrity of electrical power line systems, specifically where, the electrical power systems are conducting high or transmission class voltages in the range of 69 kV to over 500 kV is particularly important. NDT has proven to be a useful method for quality control in electrical power applications, in which component failure could have catastrophic results.

The terms "electrical component" or "electrical power line component" as used herein is understood to include electrical power line cables or wire products including electrical conductors, static lines, optical ground wires (OPGWs) or substation bus pipes and couplings or couplers associated with said cables. The terms "electrical component" or "electrical power line components" also include piece parts and devices including electrical components incorporating an insulating material such as an outdoor insulator. For ease of reference, electrical conductors, static lines, optical ground wires (OPGWs) or substation bus pipes are interchangeably referred to herein as "power line cabling" or "power line cable" or "power line conductor". Couplings may include but are not limited to compression sleeves which join ends of two power line cables together or dead-ends or dead end connectors which are used to attach power line cables to supporting structures such as support towers or poles.

U.S. Pat. No. 9,488,603 to Stock discloses a portable system for non-destructive testing of overhead electrical power-line equipment (herein referred to as the Stock system). The system includes an X-ray system and a support unit. All the components of the X-ray system are mounted to a base of the support unit. The support unit further includes a plurality of attachment members. In use, the plurality of attachment members suspends the support unit from an overhead power line so as to locate the base and at least a portion of the X-ray system below the object such as power line or coupler to be imaged. The X-ray system includes an X-ray source which is mounted to the base. The X-ray source provides X-rays which penetrate the object to be imaged. The X-rays passing through the object are captured by a digital imager which, in the use position, is positioned substantially on an opposing side of the object (as compared to the X-ray source). The digital imager processes the captured X-rays and creates a digital image which is representative of the state of the object and any defects that may exist therein. Wireless communication with a remote computer to transmit the digital images is also disclosed.

Applicant believes that the Stock system cannot be safely used without modification when the power line is energized.

Further, Applicant believes that the Stock system may not be conducive for testing components in a crowded environment such as an electric substation where anchoring of the Stock system on the object to be imaged may not be possible or may be difficult. An electric substation is a junction where usually more than two power line cables terminate. In large electric substations the total number of power line cables terminating exceeds one or two dozen. The terminating power line cables connect to bus conductors or bus pipes in the electric substation. Electric substations are typically crowded as they contain a multitude of components such as support structures for the terminating power line cables and bus pipes, switches, capacitor banks and/or transformers.

Applicant believes that use of the Stock system to test components such as power line cables or bus pipes in an electric substation or overhead power line systems presents the following problems; firstly, in order to use the Stock system, the overhead power line systems or substation must be shut down in order to de-energize the power line conductors or bus pipes. This is not efficient as shutdown would result in a power outage.

The Stock system requires suspension of the NDT equipment from the object to be imaged, for example from a power line conductor or bus pipe. In an electric substation or overhead power line system, due to the often tight spacing between various electrical components and because the Stock system has a large physical footprint, it may be difficult to maneuver the Stock system so as to suspend it from the object to be imaged without risk of snagging onto surrounding electrical components and thereby causing electrical incidents.

Applicant further believes that the Stock system may not prove useful in instances where orientation of an electrical component or a lack of strength of the electrical component does not safely allow for suspension of the Stock system's equipment from the electrical component to be imaged. For example, in order to suspend the Stock system, the electrical component to be imaged must be substantially horizontal. Also, the electrical component must be sufficiently strong to support the weight of the Stock system (approximately 30 to 35 lbs.) as the Stock system requires suspension from the electrical component.

Therefore, there is a need for an apparatus and corresponding method employing the apparatus, which can test electrical components in a sub-station or elsewhere while the components are in an energized state, irrespective of their location or orientation in an overhead electrical power line system.

SUMMARY

Accordingly in one aspect, a system for non-destructive testing of an energized electrical component which is supported in an overhead position in an electrical power line system is provided. The system comprises an elongate base having a first end and a second end and a length therebetween. The system further comprises an X-ray source adapted to be mounted on the base at about its first end, and an X-ray digital imager adapted to be mounted on the base at about its second end. When so located, the X-ray source and the X-ray digital imager are in an operative opposed facing spatial relationship. The system also comprises an imager controller adapted to be mounted to the base, and a removable electrically conductive flexible shroud or shield as used interchangeably herein and better described herein below. The shield is adapted to be operatively coupled to, and to encapsulate, at least the base, the X-ray source, the X-ray digital imager and the imager controller. In one embodiment, the electrically conductive flexible shield is also further adapted to be releasably coupled to a live-line tool. In a use position when the shield is coupled to and encapsulates at least each of the base, the X-ray source, the X-ray digital imager and the imager controller to form an electrically shrouded system, and the shrouded system is releasably coupled to the live-line tool, the shrouded system is positionable adjacent the energized electrical component so as to non-destructively test the energized electrical component. During testing, at least the base, the X-ray source, the X-ray digital imager and the imager controller are shielded from electric fields around the energized electrical component by the shield. The shield allows the passing of the X-ray frequency radiation from the X-ray source to the digital imager, while passing through the shield and object to be imaged. The shield also allows RF signal communication between the shrouded system and an external receiver while the wireless transmitter is shrouded within the shrouded system.

Accordingly in another aspect, a method for non-destructive testing of an energized electrical component which is supported in an overhead position in an electrical power line system is provided. The method comprises locating an X-ray source and an X-ray digital imager on an elongate base in an opposed facing spatial relationship, and connecting an imager controller to the base. The method further comprises encapsulating at least each of the base, the X-ray source, the X-ray digital imager, the imager controller and a wireless transmitter within a removable electrically conductive flexible shield to form a shroud substantially completely thereover. Further, in one aspect the method comprises releasably coupling the base to a live-line tool, and coupling the shroud thereto. The live-line tool is used to position the shroud and its shrouded system adjacent the energized electrical component for non-destructive testing of the energized electrical component. During testing, at least the base, the X-ray source, the X-ray digital imager, the imager controller and the wireless transmitter are shielded from electric fields around the energized electrical component. Again, the shield allows RF signal communication between the shrouded system and an external receiver while also allowing simultaneous X-ray radiation of the object to be imaged through the shroud.

BRIEF DESCRIPTION OF THE DRAWINGS

FIGS. 7A to 7D are digital (X-ray) images produced by the system described herein of defective energized conductors;

FIGS. 7A1 to 7D1 are line drawing depictions of the X-ray images of FIGS. 7A to 7D, respectively.

DETAILED DESCRIPTION

Figure 1:
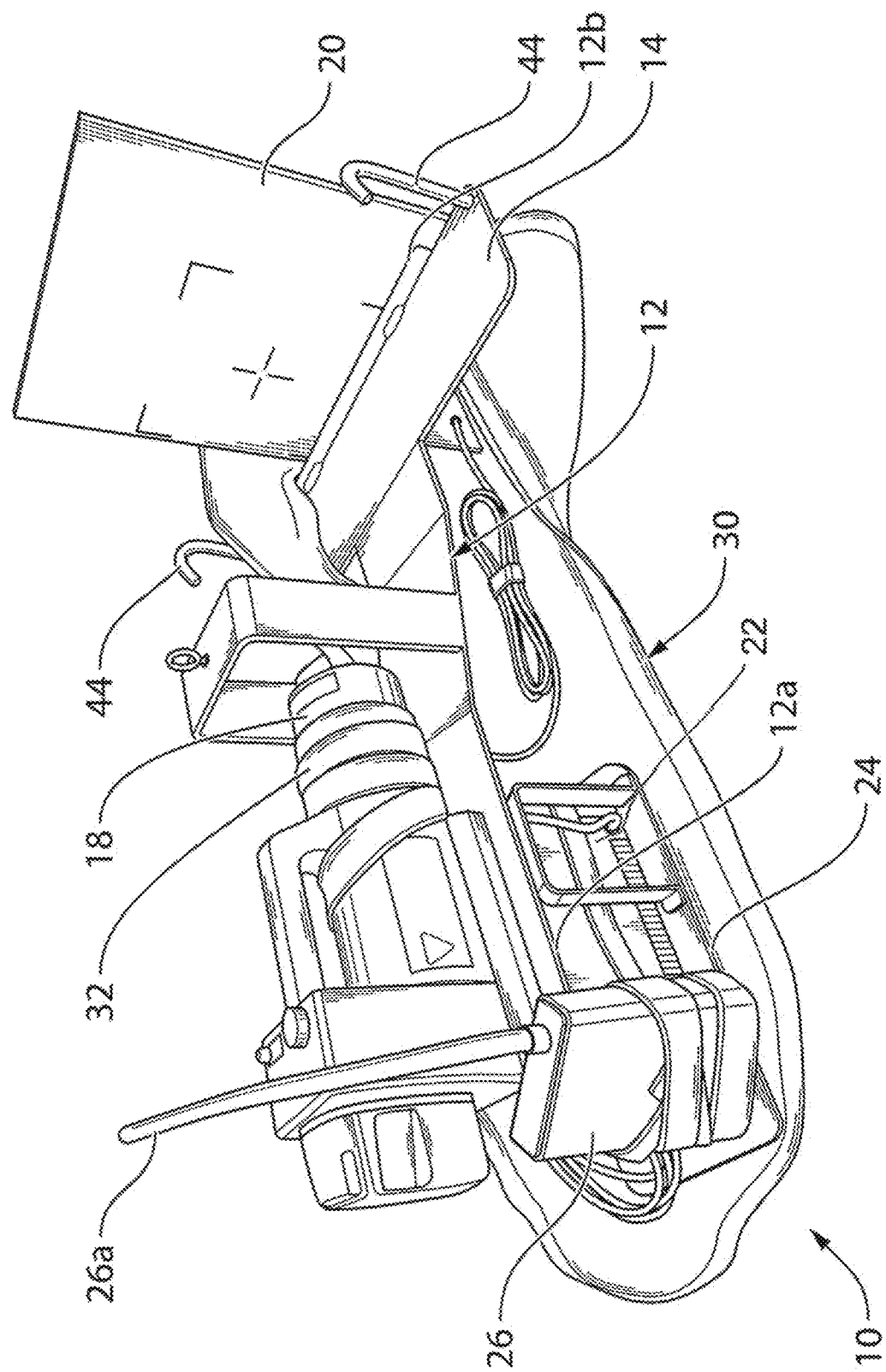
FIG. 1 is a perspective view of one embodiment of a system for nondestructive testing (NDT) of an energized electrical component, the view showing the various components of the shrouded system, namely a base, an X-ray source, an X-ray digital imager, an imager controller, and a RF communication interface and also shrouding the electrically conductive flexible shroud, wherein in this view, the flexible shroud has been illustrated in a lowered, non-encapsulating position so as to allow view of the system therein.
Figure 2:
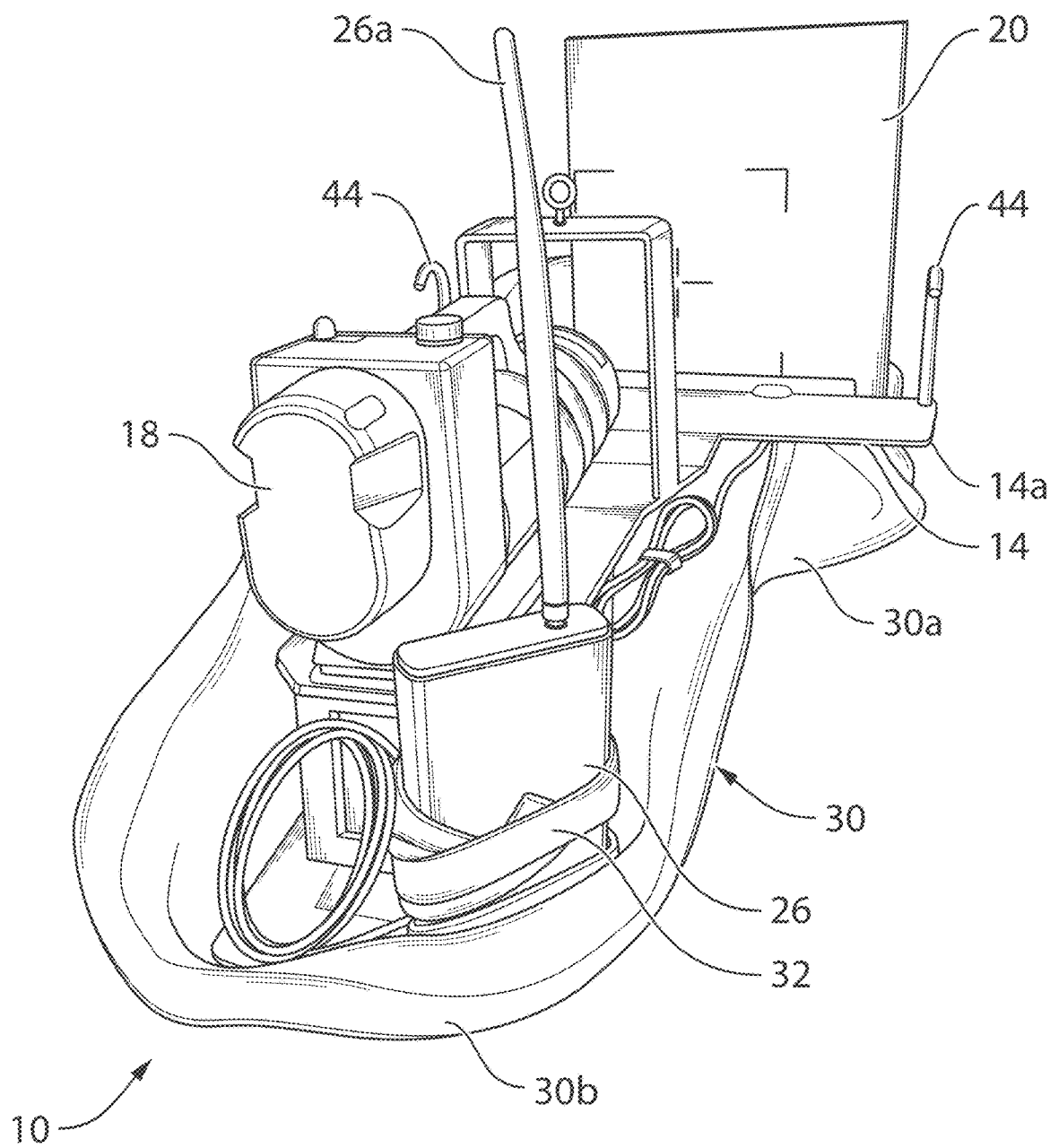
FIG. 2 is a perspective view of the system of FIG. 1 looking from an end of the system.
Figure 3:
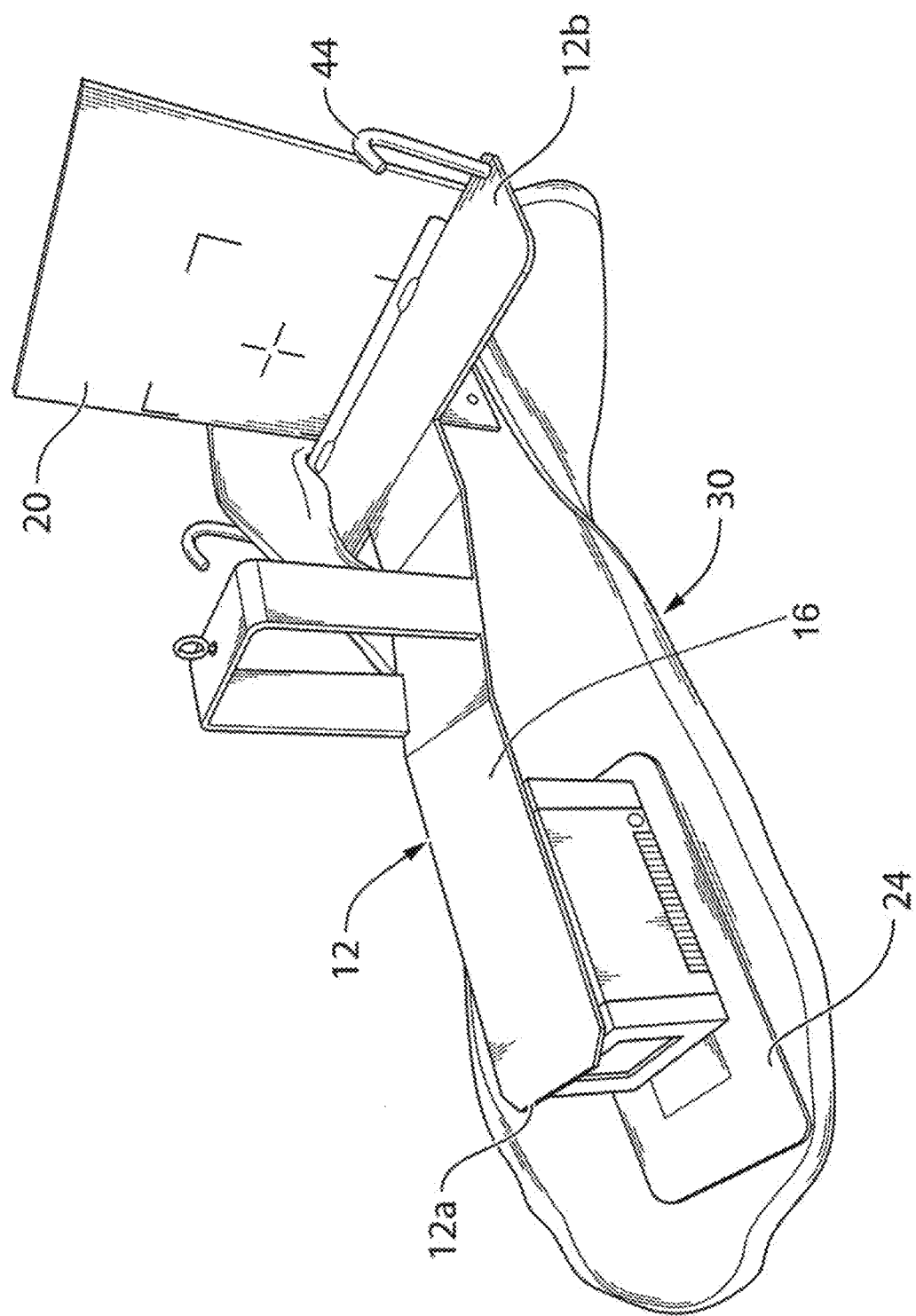
FIG. 3 is a perspective view of the system of FIG. 1 without the X-ray source and the communication interface installed.
Figure 4:
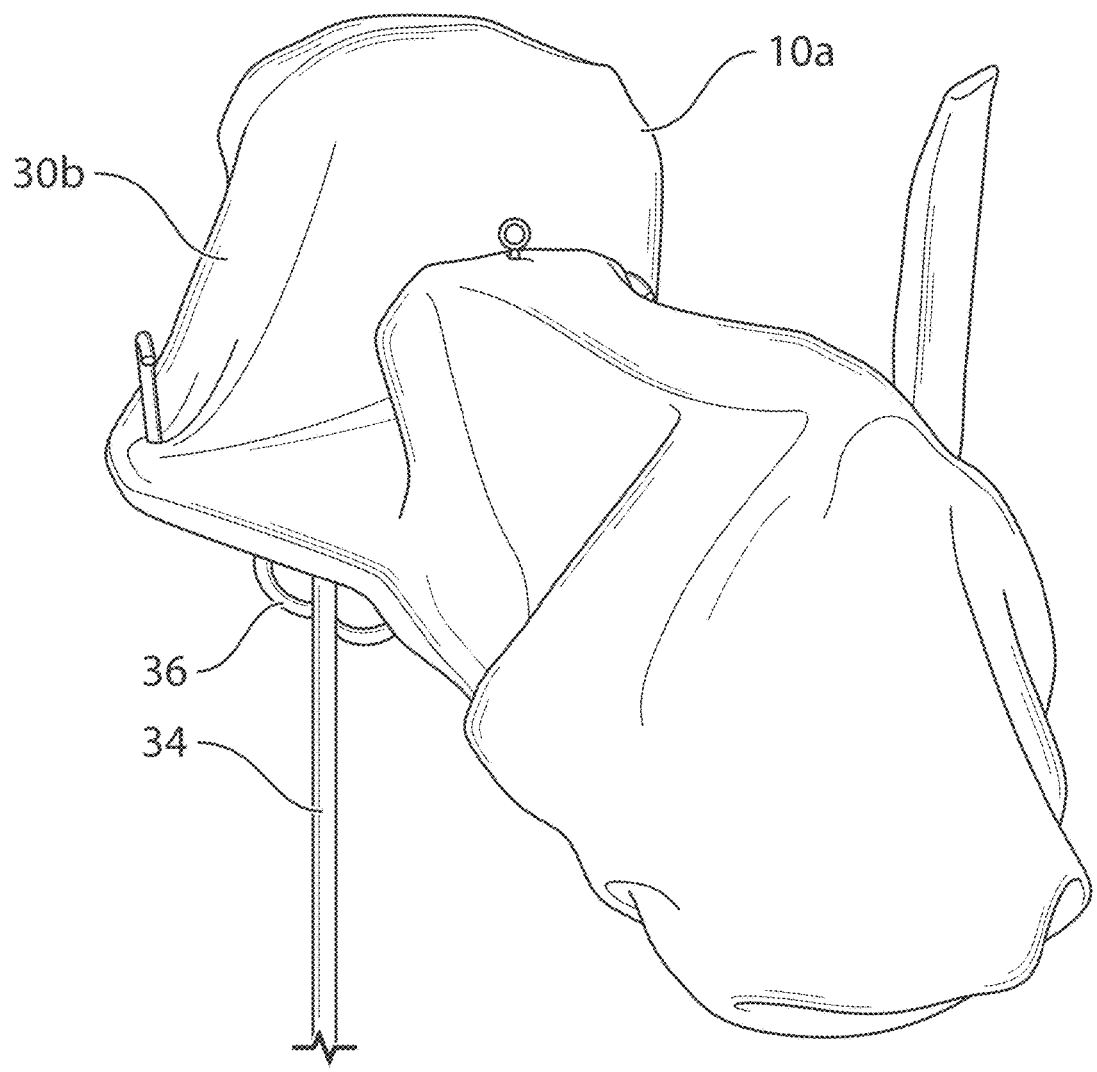
FIG. 4 is a perspective view of the system of FIG. 1 with the flexible shroud in its encapsulating position.

Embodiments described herein relate to a system and apparatus which enables non-destructive testing (NDT) of electrical power line components while they are live or energized. The system described herein enables testing while the system is directly suspended from the power line component being tested and also enables testing of electrical power line components without the system being physically connected to or anchored on the electrical power line components to be tested.

Although the system and method disclosed herein have been primarily explained in the context of energized overhead electrical power systems, the system and method may also be used for non-destructive testing of underground conductors, equipment or apparatus, terminators and associated components.

Use of the system and apparatus of the present embodiments have been described herein with reference to energized bus pipes 100 forming part of an electric substation 102 wherein the bus pipes 100 conduct voltages which may be in the range of 13.8 kV to 765 kV. Because the bus pipes are energized, significant electric fields exist around them. However, as one skilled in the art will appreciate, the system and apparatus may also be used to test other energized electrical power line components, for example, overhead electrical conductors, static lines or optical ground wires (OPGWs). Further, even though most embodiments described herein teach testing of energized electrical power line components, the present system and apparatus may also be used to test electrical power line components when they are de-energized, but the usefulness is primarily realized during testing of energized power line components.

FIGS. 1 to 4 illustrate a NDT system according to one embodiment. The system 10 includes an elongate base 12 having a first end 12a and a second end 12b. The first and second ends, 12a and 12b, respectively are spaced apart by a length. The elongate base 12 is substantially planar to support thereon other components of the system 10, although this is not intended to be limiting as the base may be other than planar or other than a single unitary structure. In one embodiment, and as seen in the accompanying figures, the base may be a T-shaped plate in plan view and includes a flange 14 and an elongate leg 16 extending perpendicularly from a center of the flange 14. The first end 12a of the base 12 is at the distal free end of the leg 16, distal from the flange. The second end 12b of the base 12 includes the free end of the flange 14, opposite first end 12a.

The system 10 further includes an X-ray source 18. The X-ray source 18 is mounted on the base 12, preferably, at its first end 12a. The X-ray source 18 may include a power supply such as a battery (not shown) for on-demand emission of X-rays from the X-ray source.

The system 10 further includes an X-ray digital imager 20 which is also mounted on the base 12. Preferably, the X-ray digital imager 20 is mounted on the base 12 at its second end 12b. The X-ray source 18 and the X-ray digital imager 20, when so located, are in an opposed facing spatial relationship so that the imager captures images of the X-rays from the source which have passed through the electrically conductive shroud and an object, such as pipe 100, being imaged. In one preferred embodiment, the X-ray digital imager 20 is a flat panel digital imager.

The X-ray digital imager 20 is associated with an imager controller 22. The imager controller 22, in one embodiment, is mounted on a support plate 24 associated with the base 12. The support plate 24 underlies the first end 12a and the leg 16 of the base 12 and extends at least along a length of the leg 16.

Suitable X-ray sources, digital imagers and imager controllers such as those manufactured and sold by Vidisco Ltd. of Or-Yehuda, Israel, including those sold under trademarks FLAT FOX-17™ and FOX-RAYZOR™ may be used in the system described herein.

Figure 5:
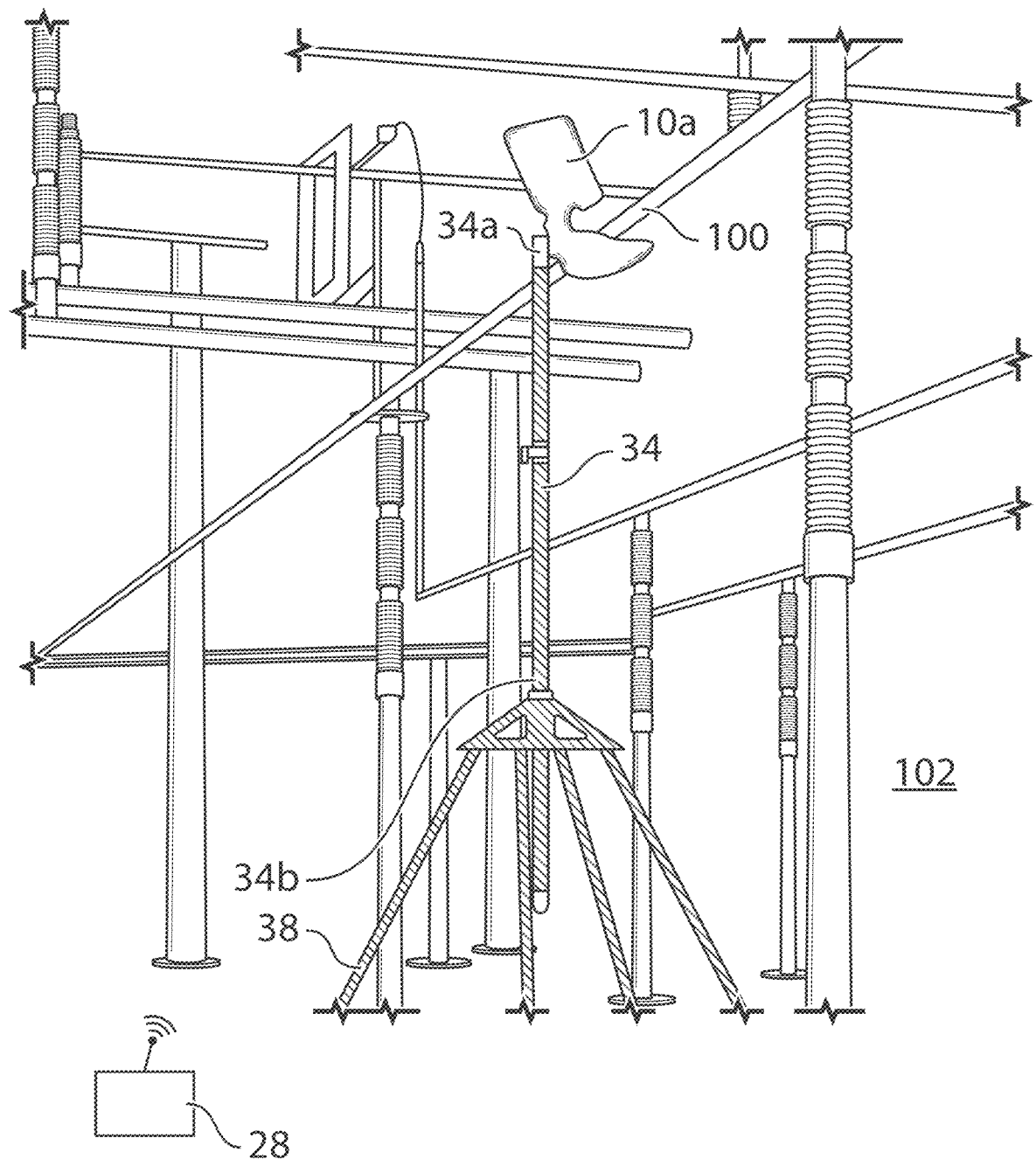
FIG. 5 is a schematic view illustrating the system of FIG. 1 in a use position according to an embodiment wherein the system of FIG. 1 is maneuvered into its use position using a live-line tool supported on a support structure.

In one embodiment, the system 10 may further comprise a communication interface 26 for communicating with a remote processing unit 28 (best seen in FIG. 5). In one embodiment, the communication interface 26 is a radio frequency wireless interface which includes an antenna 26a.

In one embodiment, the system 10 may include a cooling fan (not shown).

In order to obtain good quality images of the component to be imaged, e.g., the energized bus pipe 100, the system 10 must be positioned adjacent to the bus pipe 100 so as to position the bus pipe between the X-ray source and digital imager. As stated above, since the bus pipe 100 is energized, significant electric fields exist around the bus pipe 100. Accordingly, in one embodiment, in order to protect the system 10 from the significant electric fields around the bus pipe 100, before attaining an in-use or operative position adjacent the bus pipe 100, the system 10 is substantially entirely encased or shrouded within a flexible electrically shielding shroud which acts as a Faraday cage around all of the above described components of system 10. As one skilled in the art will understand, a Faraday cage operates so that no externally originating electrical charge will flow through the cage and that, instead, all of the electrical charge originating from the external source (in this case, electric fields surrounding the bus pipe 100) will be confined to, and flow around, an outer surface of the cage. Therefore, when the shroud, forming a Faraday cage, encapsulates or encases the above-described components, they will be protected from the harmful effects of the electric fields surrounding the bus pipe 100.

Applicant recognized that in order for the system 10 to function as desired when located proximal to the energized component (i.e. capture clear and mostly undistorted images of the energized component and transmit the captured images to a remote processing unit via the communication interface), the shroud should have at least the following characteristics, ability to attenuate an external electric field such that the components shielded by the cover are not harmed; and allows both wireless signal communication between the communication interface for example an RF transmitter and an external receiver located remotely from the system and its shroud. For example, where the communication interface is a RF wireless interface, the shroud in addition to performing a Faraday cage function around system 10, must also allow transmission of both X-ray and radio frequency (or other wireless communication frequencies) to pass simultaneously through it.

Applicant experimented with a number of ways for making the shroud. For example, Applicant tried constructing the shroud from a wire mesh with gaps or holes having a width of approximately one half inch. However, this configuration of the Faraday cage did not work in the energized environment described herein as in this experiment the RF communication did not function properly. Based on further testing it was discovered that when the shroud was formed of a material used for making so-called barehand suits, performance of the shroud improved. As one skilled in the art will understand, barehand suits are typically worn by linemen while conducting bare-hand live-line work on energized transmission lines and are typically may be made from a material including a blend of fire retardant components and metallic threads. An example of a barehand suit material is the product manufactured and sold by Alsico USA under the trademark Euclid Vidaro's KV-Gard®. The KV-Guard product includes 75% NOMEX®, a fire retardant component, and 25% stainless-steel threads.

Figure 8:
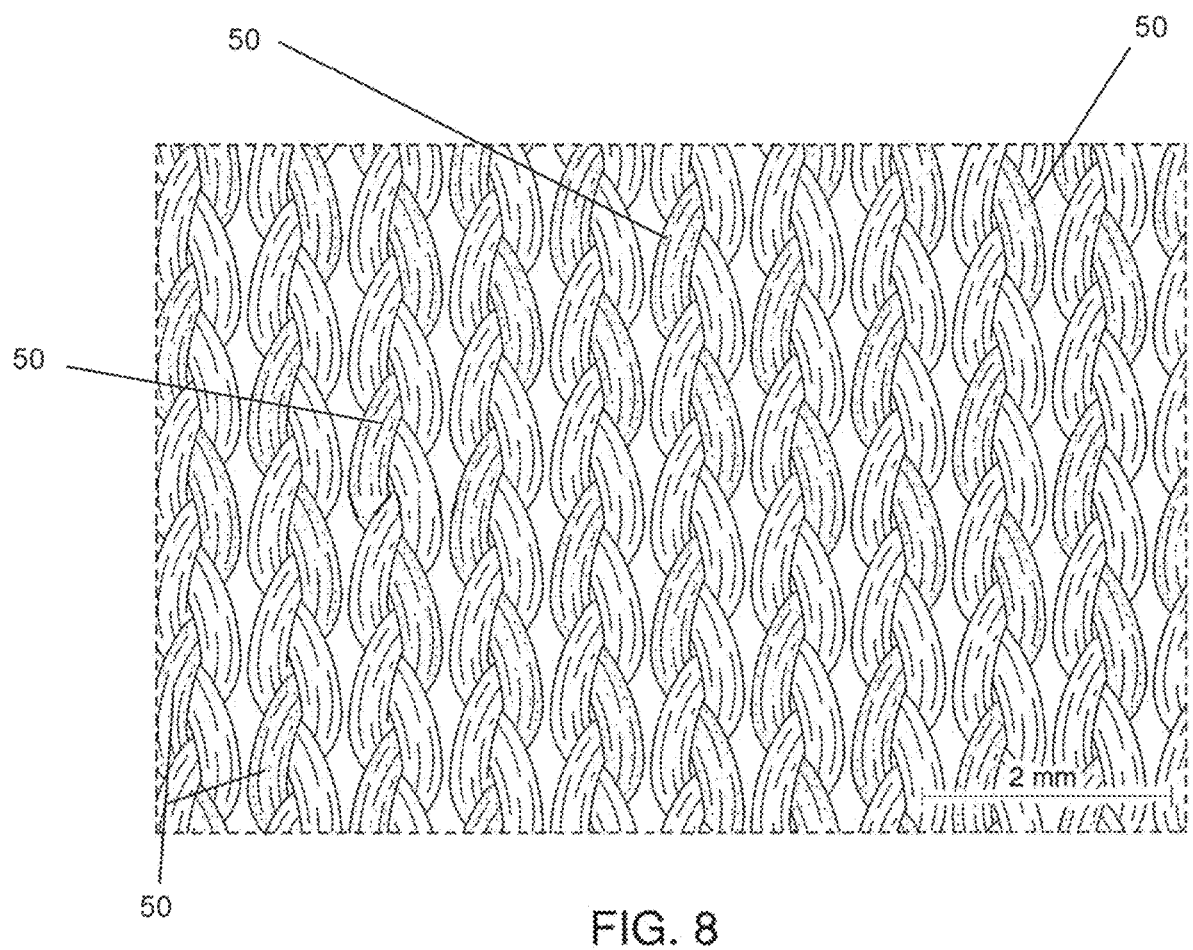
FIG. 8 is an enlarged view of a portion of the flexible shroud of FIG. 1 according to one embodiment.

Based on further experimentation Applicant discovered that when the barehand suit material, for example the non-electrically conductive threads and the metallic threads 50 are woven in a grid pattern such as the illustrated herringbone pattern in FIG. 8 (when the relative size of the repeating weave pattern is approximately 15 mm to 20 mm in a vertical direction in the approximately fifteen times magnification of FIG. 8, and 10 mm in a horizontal direction in FIG. 8), the shroud effectively formed a Faraday cage around the system 10 in the energized environment described herein while allowing radiation in the X-ray and Wi-Fi frequencies to pass through the shroud.

In FIG. 8, each herringbone in the weave pattern is an interwoven blend of non-electrically conductive threads (e.g. fire retardant threads) and electrically conductive threads 50. Conductive threads 50 may be metal threads such as made from stainless steel or silver.

Thus, in one embodiment, the shroud 30 is a removable, electrically conductive, flexible shroud formed from a herringbone weave of conductive and non-electrically conductive threads. Shroud 30 may be formed as a customized or specialized form-fitted cover which is cut to a geometric form or shape corresponding to a geometric form or shape of the base 12 when the base is fitted with the components of system 10 so as to substantially fully, or fully encapsulate the system. It will be appreciated that the accompanying drawings only illustrate one representative shape of the flexible shroud 30. This is not intended to be limiting.

Shroud 30 is adapted to be operatively coupled so as to be electrically conductively coupled to the components of the system 10. Accordingly, one or more fastening elements may be provided on an inside surface 30*a* of shroud 30 for operatively coupling shroud 30 to its encapsulated system 10; namely, at least each of the base 12, the X-ray source 18, the digital imager 20, the imager controller 22, the communication interface 26 and an antenna 26*a*. As shown in the figures, the one or more fastening elements may be electrically conductive straps 32 which may be wrapped around one or more of the above-stated components for operatively coupling shroud 30 to those components. Prior to the system 10 attaining or being positioned into its in-use position, all of the components of the system 10 including those stated above are entirely encased within the flexible shroud 30 to form a shrouded system 10*a*.

Operation of the shrouded system 10*a* will now be described with reference to FIGS. 5 and 6.

As stated above, the system 10 may be used to non-destructively test bus pipes 100 in an electric substation 102. The bus pipes 100 are thus in an overhead position and energized. Testing may be undertaken, for example as a pre-set quality control process, to understand the current state of the bus pipes 100 and to identify any defects not visible to the eye that may be present in them.

After the various components of the system 10 have been mounted on the base 12 in the arrangement described above, the flexible shroud 30 is operatively coupled to each and every component of the system 10, for example to include the base 12, the X-ray source 18, the digital imager 20, the imager controller 22, the communication interface 26 and the antenna 26*a*. As described above, coupling may be achieved by wrapping the straps 32 around each and every component of the system 10. All the above-stated components of the system 10 are then entirely encased within the flexible shroud 30 to form the shrouded system 10*a*.

The shrouded system 10*a* is then gripped or supported by a live-line tool such as a hot stick 34 to position the shrouded system 10*a* adjacent the object to be imaged such as the section of bus pipe 100. In order to obtain good quality images of the bus pipe 100, preferably, the system 10*a* is positioned so that the bus pipe 100 positioned closely adjacent the digital imager 20 between the X-ray source 18 and the digital imager 20.

Hot stick 34 may be a so-called shotgun stick known in the art which has a clamping mechanism (not shown) at its distal or working end 34*a* for grasping the shrouded unit 10*a*. It may also be possible to use hot sticks 34 that do not have a clamping mechanism, but, may have a fixed hook or other distal end configuration to couple to base 12, for example for engaging closed loops or handles on the base. In such embodiments, an outer surface 30*b* of the flexible shroud 30 is provided with a coupling interface 36 which is adapted to receive or engage with the fixed hook or other distal end configuration on the hot stick 34.

Depending on the location of the bus pipe 100 in the electric substation 102, various arrangements may be used to position the shrouded system 10*a* in the described location described above. In one embodiment and with reference to FIG. 5, the hot stick 34 is supported on a quadripod 38 through its non-working or handle end 34*b* and the shrouded system 10*a* is supported or otherwise coupled or connected to the working end 34*a* of the hot stick 34. This arrangement is typically used when the bus pipe 100 is located in a confined overhead space. The quadripod 38 is located below an opening in the confined space containing the section of bus pipe 100 to be imaged. The hot stick 34 aids in vertical insertion and extraction of the shrouded system 10*a* into and from the confined space. As one skilled in the art will appreciate, a bipod, tripod or other supporting structure may also be used to support the hot stick 34. For increased range of motion of the shrouded system 10*a* about working end 34*a*, the shrouded system 10*a* may be supported or connected to the working end 34*a* of the hot stick 34 through a universal joint (not shown).

Figure 6:
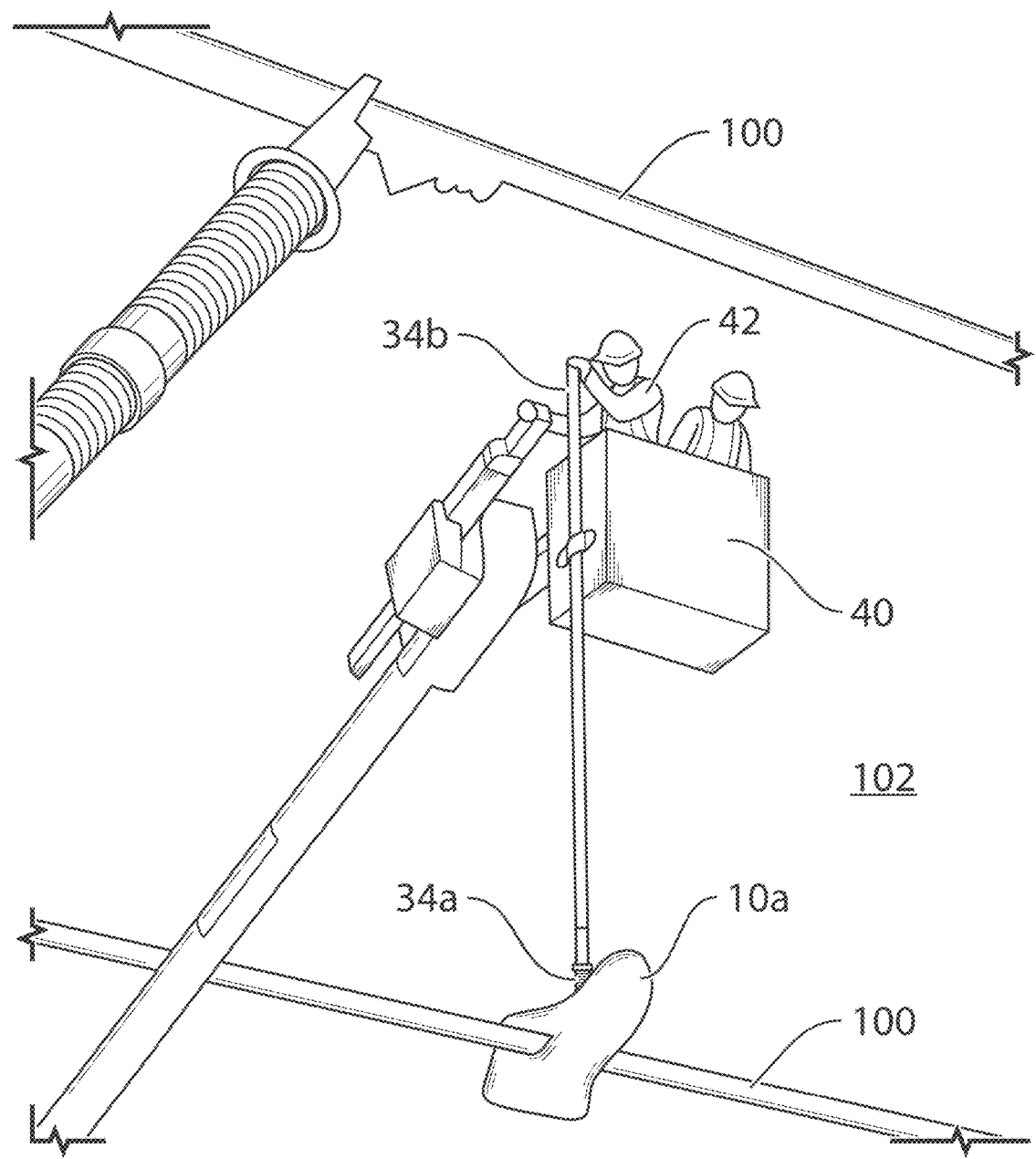
FIG. 6 is a schematic view illustrating the system of FIG. 1 in a use position according to another embodiment, wherein, the system of FIG. 1 is anchored to a live-line tool which is in turn is held suspended from an aerial lift platform such as a bucket truck.
Figure 7A:
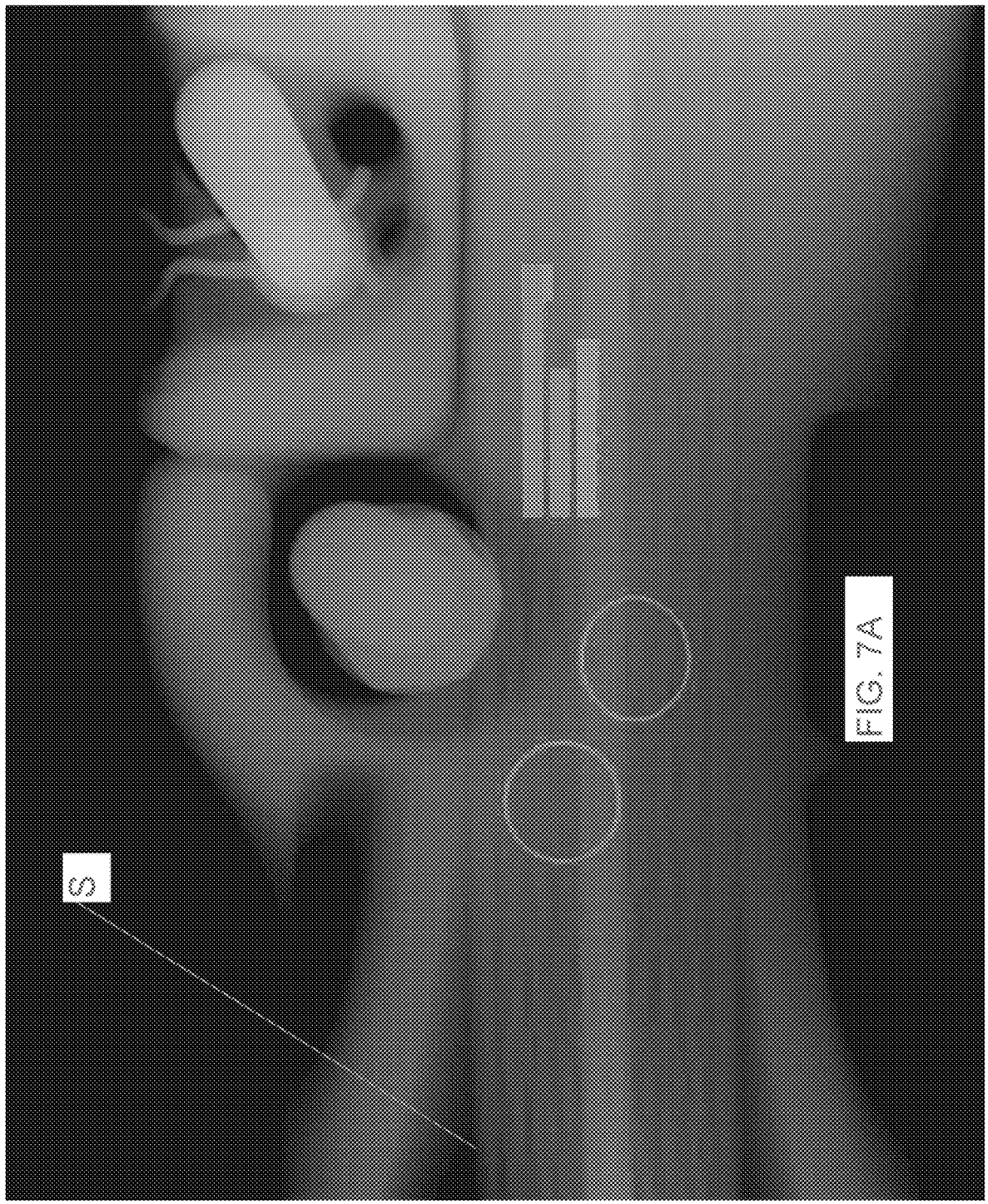
Figure 7C:
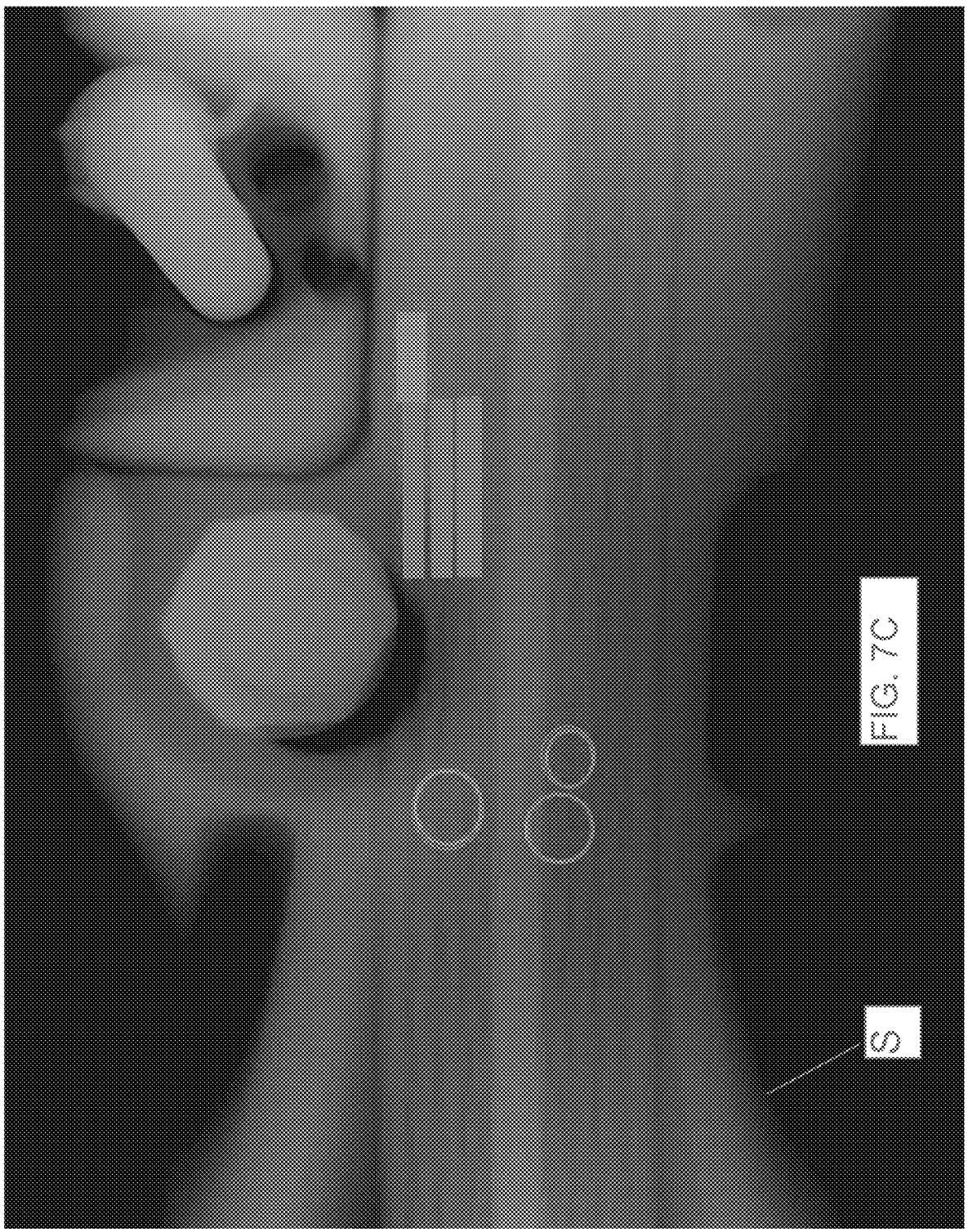
Figure 7D:
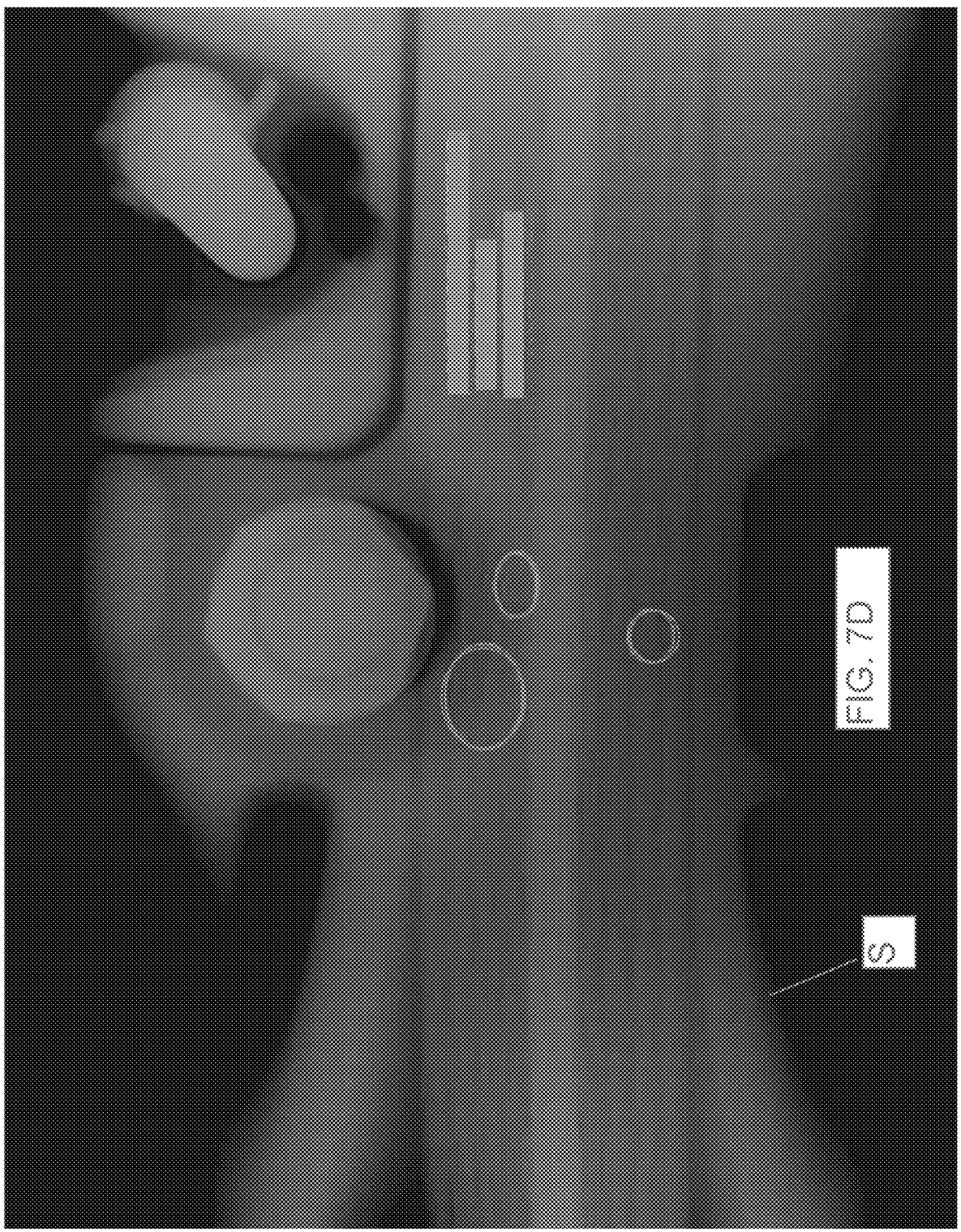

In another embodiment, if there is no opening to the confined overhead space (where the bus pipe 100 is located) from below the confined space, the bus pipe 100 may be reached from above the confined space as illustrated in FIG. 6. As shown in FIG. 6, the shrouded system 10*a* is connected to the working end 34*a* of the hot stick 34 and the hot stick with the attached shrouded system is suspended from an elevated bucket truck 40 by a lineman 42 located inside the bucket truck 40. The lineman 42 may manipulate the non-working end 34*b* (the handle) of the hot stick 34 in order to position the shrouded system 10*a* in the desired position adjacent the bus pipe 100.

In another embodiment, if the bus pipe 100 is not located in a confined overhead space and if the bus pipe is sufficiently strong to support the weight of the shrouded unit 10*a* (for example, approximately 50 to 55 pounds), the shrouded system 10*a* may be suspended from the bus pipe 100. In order to enable suspension of the shrouded system 10*a* directly from the object to be imaged (e.g. an energized conductor or bus pipe 100), the system 10 may be provided with a pair of spaced apart suspension members. In one embodiment, the suspension members include a pair of hooks 44 projecting from each of the opposed short edges 14*a*, 14*a* of the flange 14. In an operative position, the flexible shroud 30 will encase all the components of system 10 except the hooks 44.

After the shrouded system 10*a* has been maneuvered to the desired position adjacent the bus pipe 100, the power supply (not shown) associated with the X-ray source 18 is actuated to produce X-rays. The X-rays pass through the section of bus pipe 100 located between the X-ray source 18 and the digital imager 20. The digital imager 20 captures the X-rays passing through the bus pipe 100 and creates a digital image thereof which is representative of the state of the bus pipe 100. The use of the shroud made of barehand suit material enables a first communication (the X-ray radiation signal) between the X-ray source and the digital imager so as to image the bus pipe 100 positioned therebetween, and the transmission, for example simultaneously or sequentially, of a second communication (the radio transmission) between system 10 and a remote processor and display such as a remotely located laptop computer.

The wireless interface 26 provides for wireless communication between the shrouded system 10*a* and the remote processing unit 28 so as to transmit digital images taken or captured by the shrouded system 10a to the remote processing unit 28 for further processing. Again, the remote processing unit 28 may be a computer or a laptop or a mobile digital device. Shroud 30 enables both the first and second signal communications.

Applicant contemplates that the system 10 described herein could also be used for non-destructive testing (NDT) of electrical power line components that are not energized. For this application however, where the de-energized bus pipe being checked parallels one or more energized bus pipes, voltages may be induced in the de-energized bus pipe. In order to protect the system 10 from electric fields generated due to induced voltages, in some applications, especially when the bus pipes are in a transmission substation, it may be advisable to use the flexible shroud 30 as described herein.

In experiments to test system 10a, the shrouded system 10a was used to take digital (X-ray) images of a section S of an energized electrical conductor (see FIGS. 7A to 7D and 7A1 to 7D1) containing defects in a simulated environment at Applicant's test facility. Defects were introduced into the electrical conductor by cutting some of the conductor strands at various locations along the section S. The electrical conductor was subsequently energized. One of the objectives was to determine whether these defects could be identified from the digital images taken by the shrouded system 10a. Another objective was to determine whether the digital images could be taken without damaging the various components of the shrouded system 10a.

The following observations were made:
1. The defects were easily identifiable from the digital images taken by the shrouded system 10a. FIGS. 7A to 7D (as sated above, 7A1 to 7D1 are line drawing depictions of the X-ray images of 7A to 7D) are the digital images taken by the shrouded system 10a of the defective energized conductor section S. For ease of identification, areas of the energized conductor section S containing the defects (i.e. cut in the conductor strands) have been circled in FIGS. 7A to 7D and FIGS. 7A1 to 7D1.
2. Further, the digital images were taken by the shrouded system 10a without any damage to its components.
3. It is postulated that the barehand suit material forming shroud 30 may be close to being an optimized form of Faraday shield in the sense that it allows both RF communication through it, and nearly interference-free X-ray transmission from the X-ray source and reception by the digital imager through it also, while providing protective shielding of the system in a highly energized environment due to the high voltage in the object to be imaged.

What is claimed is:

1. A system for non-destructive testing of an energized electrical component which is supported in an overhead position in an electrical power line system, the system comprising:
   an elongate base having a first end and a second end and a length therebetween;
   an X-ray source adapted to be mounted on the base at about its first end;
   an X-ray digital imager adapted to be mounted on the base at about its second end, wherein the X-ray source and the X-ray digital imager, when so located, are in an operative opposed facing spatial relationship;
   an imager controller adapted to be mounted to the base; and
   a removable electrically conductive flexible shield adapted to be operatively coupled to, and to encapsulate, at least the base, the X-ray source, the X-ray digital imager and the imager controller, the shield being further adapted to be releasably coupled to a live-line tool, and wherein,
   when the shield is coupled to and encapsulates at least each of the base, the X-ray source, the X-ray digital imager and the imager controller to form a shrouded system, and the shrouded system is releasably coupled to the live-line tool, the shrouded system is positionable adjacent the energized electrical component so as to non-destructively test the energized electrical component while shielding at least the base, the X-ray source, the X-ray digital imager and the imager controller from electric fields around the energized electrical component and allowing at least one signal communication between the shrouded system and an external component.

2. The system of claim 1, wherein the external component is the energized electrical component and the at least one signal communication includes a first signal communication between at least the X-ray source and the energized electrical component.

3. The system of claim 1, wherein the shield is a flexible form-fitted woven cover which includes inter woven electrically conductive threads.

4. The system of claim 3, wherein electrically conductive threads are metallic threads.

5. The system of claim 4, wherein the woven cover is formed in a herringbone pattern having a repetitive weave in the range of substantially 10 mm to 20 mm.

6. The system of claim 3, wherein the flexible cover includes one or more electrically conductive flexible fastening elements on an inside surface thereof for electrically conductive coupling of the flexible cover to at least the base, the X-ray source, the digital imager and the imager controller.

7. The system of claim 6, wherein an outside surface of the flexible cover includes at least one coupling interface which is adapted to receive, engage or couple with the live-line tool.

8. The system of claim 3 further comprising a communication interface to communicate with a remote processing unit.

9. The system of claim 8, wherein the flexible cover is further adapted to be operatively coupled to the communication interface and encapsulate the communication interface during use.

10. The system of claim 9, wherein the communication interface is a wireless interface.

11. The system of claim 10, wherein the external component is the remote processing unit and the at least one signal communication includes a second signal communication between the encapsulated communication interface and the remote processing unit.

12. The system of claim 1, wherein the base is a T-shaped plate in plan view and includes a flange and an elongate leg extending perpendicularly from a center of the flange, and wherein the first end of the base is defined by an outer, free end of the leg distal from the flange, and the second end of the base includes the flange.

13. The system of claim 12, wherein the base further comprises a support plate underlying the leg and extending at least along a length thereof.

14. The system of claim 13, wherein the imager controller is mounted on the support plate.

15. A method for non-destructive testing of an energized electrical component which is supported in an overhead position in an electrical power line system, the method comprising:

locating an X-ray source and an X-ray digital imager on an elongate base in an opposed facing spatial relationship;

connecting an imager controller to the base;

encapsulating at least each of the base, the X-ray source, the X-ray digital imager and the imager controller within a removable electrically conductive flexible shield to form a shroud thereover;

releasably coupling a live-line tool to the shroud;

manipulating the live-line tool to position the shroud adjacent the energized electrical component for non-destructive testing of the energized electrical component while shielding at least the base, the X-ray source, the X-ray digital imager and the imager controller from electric fields around the energized electrical component and allowing at least one signal communication between the shroud and an external component.

16. The method of claim 15, wherein the external component is the energized electrical component and non-destructive testing of the energized electrical component includes taking at least one digital image of the energized electrical component by allowing a first signal communication in the X-ray bandwidth between the shroud and the energized electrical component.

17. The method of claim 15, wherein the step of encapsulation further comprises encapsulating at least each of the base, the X-ray source, the X-ray digital imager and the imager controller within a removable electrically conductive flexible form-fitted cover.

18. The method of claim 15 further comprises wirelessly transmitting the at least one digital image via a wireless interface located on the base.

19. The method of claim 18, wherein the external component is a remote processing unit and wirelessly transmitting includes allowing a second signal communication in the Wi-Fi bandwidth between the shroud and the remote processing unit.

* * * * *